United States Patent
Nakai et al.

(10) Patent No.: US 10,781,270 B2
(45) Date of Patent: Sep. 22, 2020

(54) METHOD OF PRODUCTION OF HIGHLY SATURATED NITRILE RUBBER

(71) Applicant: ZEON CORPORATION, Tokyo (JP)

(72) Inventors: Akito Nakai, Tokyo (JP); Shinsuke Sugawara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 79 days.

(21) Appl. No.: 15/544,239

(22) PCT Filed: Dec. 25, 2015

(86) PCT No.: PCT/JP2015/086268
§ 371 (c)(1),
(2) Date: Jul. 17, 2017

(87) PCT Pub. No.: WO2016/121284
PCT Pub. Date: Aug. 4, 2016

(65) Prior Publication Data
US 2018/0016360 A1    Jan. 18, 2018

(30) Foreign Application Priority Data
Jan. 27, 2015  (JP) ................. 2015-012900

(51) Int. Cl.
*C08C 19/02* (2006.01)
*C08L 15/00* (2006.01)
*C08F 236/12* (2006.01)

(52) U.S. Cl.
CPC ............ *C08C 19/02* (2013.01); *C08F 236/12* (2013.01); *C08L 15/005* (2013.01)

(58) Field of Classification Search
CPC .................. C08C 19/20; C08C 19/02
See application file for complete search history.

(56) References Cited

U.S. PATENT DOCUMENTS

2011/0190441 A1* 8/2011 Brandau ............... C08C 19/02
                                                          524/565
2014/0124986 A1* 5/2014 Lima .................... C08F 2/22
                                                          264/328.1

FOREIGN PATENT DOCUMENTS

| JP | 2003-221407 | * | 8/2003 |
| JP | 3932916 B2 |   | 6/2007 |
| WO | 03/064480 A1 |   | 8/2003 |

OTHER PUBLICATIONS

Translation of JP 2003-221407 (2003) (Year: 2003).*
Mar. 29, 2016 International Search Report issued in International Patent Application No. PCT/JP2015/086268.
Dec. 27, 2019 Office Action issued in Indian Patent Application No. 201717025688.
Theerachai Pruttisirikul et al., "Thioacetate- and mercapto-functionalized hydrogenated natural rubber," Reactive & Functional Polymers 70, 2010, pp. 674-683.
May 12, 2020 Office Action issued in Brazilian Patent Application No. BR 112017015481.

* cited by examiner

Primary Examiner — Robert C Boyle
(74) Attorney, Agent, or Firm — Oliff PLC

(57) ABSTRACT

Method of production of highly saturated nitrile rubber, including: polymerization step of polymerizing monomer mixture containing at least $\alpha,\beta$-ethylenically unsaturated nitrile monomer and diene monomer in medium to obtain dispersion or solution of nitrile rubber; coagulation step causing the nitrile rubber dispersion or solution to coagulate at 10-60° C. to obtain solid form nitrile rubber; hydrogenation reaction step causing solid form nitrile rubber to disperse or dissolve in medium to obtain the nitrile rubber dispersion or solution and performing hydrogenation reaction of the obtained nitrile rubber dispersion or solution to obtain dispersion or solution of highly saturated nitrile rubber, wherein the hydrogenation reaction, the content of compound having a mercapto group having 9-12 carbon atoms is 50 wt ppm or less and content of compound having a mercapto group having 13-16 carbon atoms is 1-120 wt ppm with respect to 100 wt % of the nitrile rubber content in the nitrile rubber dispersion or solution.

7 Claims, No Drawings

METHOD OF PRODUCTION OF HIGHLY SATURATED NITRILE RUBBER

TECHNICAL FIELD

The present invention relates to a method of production of a highly saturated nitrile rubber, more particularly relates to a method of production of a highly saturated nitrile rubber able to improve the reactivity of a hydrogenation reaction.

BACKGROUND ART

In the past, nitrile rubber (acrylonitrile-butadiene copolymer rubber) has been used as a material for rubber parts for automobiles such as hoses, belts, and tubes utilizing its oil resistance, mechanical properties, chemical resistance, etc. Further, the highly saturated nitrile rubber obtained by saturation of the nitrile rubber by hydrogenation of the carbon-carbon double bonds in the polymer main chain is further excellent in heat resistance, so is being used for rubber parts such as seals, belts, hoses, and gaskets.

For example, Patent Document 1 discloses a method of production of a highly saturated nitrile rubber comprising hydrogenating, in the presence of a hydrogenation catalyst, a polymer which is obtained by causing a conjugated diene monomer and an α,β-unsaturated nitrile monomer to copolymerize in the presence of a molecular weight adjuster having a mercapto group and which has a residual amount of that molecular weight adjuster of 40 ppm or less.

RELATED ART

Patent Documents

Patent Document 1: Japanese Patent No. 3932916

SUMMARY OF THE INVENTION

Problem to be Solved by the Invention

In the above Patent Document 1, it is learned that the compound having a mercapto group used as a molecular weight adjuster ends up acting to poison a hydrogenation catalyst when performing a hydrogenation reaction and results in the reactivity of the hydrogenation reaction falling. In view of this, it controls the compound having a mercapto group used as the molecular weight adjuster to 40 ppm or less.

On the other hand, as such a hydrogenation catalyst, in general, one containing a precious metal such as palladium is used, so from the viewpoint of protecting the environment and conserving resources and of cutting manufacturing costs, reduction of the amount of hydrogenation catalyst which is used is being studied. Performing the hydrogenation reaction with a high reactivity even if reducing the amount of hydrogenation catalyst in this way is being sought. However, in the art of the above Patent Document 1, the reactivity of the hydrogenation reaction is not necessarily sufficient when reducing the amount of the hydrogenation catalyst. For this reason, realizing a sufficient reactivity even if reducing the amount of hydrogenation catalyst has been sought.

The present invention was made in view of such a situation and has as its object the provision of a method of production of a highly saturated nitrile rubber able to improve the reactivity of a hydrogenation reaction.

Means for Solving the Problem

The present inventors engaged in intensive studies on the compound having mercapto group and the reactivity of the hydrogenation reaction so as to achieve the above object whereupon the present inventors discovered that by making the coagulation temperature at the time of coagulation after polymerization of the nitrile rubber a specific range and by making the content of a compound having a mercapto group having 9 to 12 carbon atoms and the content of a compound having a mercapto group having 13 to 16 carbon atoms in the reaction solution at the time of a hydrogenation reaction predetermined ranges, it becomes possible to further improve the reactivity of the hydrogenation reaction and thereby completed the present invention.

That is, according to the present invention, there is provided a method of production of a highly saturated nitrile rubber comprising: a polymerization step of polymerizing a monomer mixture containing at least an α,β-ethylenically unsaturated nitrile monomer and diene monomer in a medium to obtain a dispersion or solution of a nitrile rubber; a coagulation step of causing the dispersion or solution of the nitrile rubber to coagulate at 10 to 60° C. to obtain a solid form nitrile rubber; and a hydrogenation reaction step of causing the solid form nitrile rubber obtained by the coagulation step to disperse or dissolve in a medium to obtain a dispersion or solution of the nitrile rubber and performing a hydrogenation reaction of the obtained dispersion or solution of the nitrile rubber to thereby obtain a dispersion or solution of a highly saturated nitrile rubber, wherein in the hydrogenation reaction, the content of a compound having a mercapto group having 9 to 12 carbon atoms is 50 wt ppm or less and the content of a compound having a mercapto group having 13 to 16 carbon atoms is 1 to 120 wt ppm with respect to 100 wt % of the content of the nitrile rubber in the dispersion or solution of the nitrile rubber.

In the method of production of the present invention, preferably the method further comprises using a compound having a mercapto group having 9 to 12 carbon atoms and/or a compound having a mercapto group having 13 to 16 carbon atoms as a molecular weight adjuster in the polymerization step and adding a compound having a mercapto group having 9 to 12 carbon atoms and/or a compound having a mercapto group having 13 to 16 carbon atoms when causing the solid form nitrile rubber obtained by the coagulation step to disperse or dissolve in a medium to adjust the content of the compound having a mercapto group having 9 to 12 carbon atoms and/or the compound having a mercapto group having 13 to 16 carbon atoms in the dispersion or solution of the nitrile rubber used for the hydrogenation reaction.

In the method of production of the present invention, preferably the method further comprises, after the polymerization step and before the coagulation step, a heating step of heating the dispersion or solution of the nitrile rubber obtained by the polymerization step in the presence of a basic compound.

In the method of production of the present invention, preferably the basic compound is an alkali metal compound.

In the method of production of the present invention, preferably the heating temperature of the heating step is 30 to 80° C.

In the method of production of the present invention, preferably, in the hydrogenation reaction step, the amount of use of the hydrogenation catalyst is 10 to 1000 wt ppm in range with respect to 100 wt % of the nitrile rubber before hydrogenation.

Further, according to the present invention, there is provided a solution or dispersion of a nitrile rubber for hydrogenation, wherein the nitrile rubber has at least α,β-ethylenically unsaturated nitrile monomer units and diene monomer units, the content of a compound having a mercapto group having 9 to 12 carbon atoms is 50 wt ppm or less, and the content of a compound having a mercapto group having 13 to 16 carbon atoms is 1 to 120 wt ppm with respect to 100 wt % of the content of the nitrile rubber, and the amount of residual organic acid is 15 wt % or less.

Effects of Invention

According to the present invention, it is possible to provide a method of production of a highly saturated nitrile rubber able to improve the reactivity of a hydrogenation reaction. According to that method of production, a highly saturated nitrile rubber raised in hydrogen conversion rate can be suitably obtained.

DESCRIPTION OF EMBODIMENTS

The method of production of a highly saturated nitrile rubber of the present invention comprises:

a polymerization step of polymerizing a monomer mixture containing at least an α,β-ethylenically unsaturated nitrile monomer and diene monomer in a medium to obtain a dispersion or solution of a nitrile rubber;

a coagulation step of causing the dispersion or solution of the nitrile rubber to coagulate at 10 to 60° C. to obtain a solid form nitrile rubber; and a hydrogenation reaction step of causing the solid form nitrile rubber obtained by the coagulation step to disperse or dissolve in a medium to obtain a dispersion or solution of the nitrile rubber and performing a hydrogenation reaction of the obtained dispersion or solution of the nitrile rubber to thereby obtain a dispersion or solution of a highly saturated nitrile rubber, wherein in the hydrogenation reaction, the content of a compound having a mercapto group having 9 to 12 carbon atoms is 50 wt ppm or less and the content of a compound having a mercapto group having 13 to 16 carbon atoms is 1 to 120 wt ppm with respect to 100 wt % of the content of the nitrile rubber in the dispersion or solution of the nitrile rubber.

<Polymerization Step>

The polymerization step in the method of production of the present invention is a step of polymerizing a monomer mixture containing at least an α,β-ethylenically unsaturated nitrile monomer and diene monomer in a medium to obtain a dispersion or solution of a nitrile rubber.

The monomer mixture used in the method of production of the present invention is not particularly limited so long as one containing monomers corresponding to the desired composition, but one containing at least an α,β-ethylenically unsaturated nitrile monomer and a diene monomer may be used.

The α,β-ethylenically unsaturated nitrile monomer is not particularly limited, but one having 3 to 18 carbon atoms is preferable, while one having 3 to 9 carbon atoms is particularly preferable. As specific examples, acrylonitrile, methacrylonitrile, α-chloroacrylonitrile, etc. may be mentioned. Among these as well, acrylonitrile is preferable. These α,β-ethylenically unsaturated nitrile monomers may be used as single types alone or may be used as two types or more combined.

In the monomer mixture used in the method of production of the present invention, the amount of use of the α,β-ethylenically unsaturated nitrile monomer may be suitably determined in accordance with the composition of the finally obtained highly saturated nitrile rubber, but is preferably 8 to 60 wt %, more preferably 12 to 58 wt %, still more preferably 16 to 50 wt %. By making the amount of use of the α,β-ethylenically unsaturated nitrile monomer the above range, the obtained highly saturated nitrile rubber can be made excellent in oil resistance and cold resistance.

The diene monomer is not particularly limited, but a conjugated diene having 4 or more carbon atoms such as 1,3-butadiene, isoprene, 2,3-dimethyl-1,3-butadiene, and 1,3-pentadiene; a nonconjugated diene having 5 to 12 carbon atoms such as 1,4-pentadiene and 1,4-hexadiene may be mentioned. Among these, a conjugated diene is preferable, while 1,3-butadiene is more preferable.

In the monomer mixture used in the method of production of the present invention, the amount of use of the diene monomer may be suitably determined in accordance with the composition of the finally obtained highly saturated nitrile rubber, but is preferably 40 to 90 wt %, more preferably 41 to 85 wt %, still more preferably 43 to 80 wt %. By making the amount of use of the diene monomer the above range, it is possible to make the obtained highly saturated nitrile rubber one which maintains its heat resistance and chemical stability well while being excellent in rubber elasticity.

Further, the monomer mixture used in the method of production of the present invention may be one containing a carboxyl group-containing monomer in addition to the above-mentioned α,β-ethylenically unsaturated nitrile monomer and diene monomer.

The carboxyl group-containing monomer is not particularly limited so long as a monomer able to copolymerize with the α,β-ethylenically unsaturated nitrile monomer or diene monomer and having one or more unsubstituted (free) carboxyl groups which are not esterified etc.

As the carboxyl group-containing monomer, for example, an α,β-ethylenically unsaturated monocarboxylic acid monomer, α,β-ethylenically unsaturated polyvalent carboxylic acid monomer, α,β-ethylenically unsaturated dicarboxylic acid diester monomer, α,β-ethylenically unsaturated dicarboxylic acid mono ester monomer, etc. may be mentioned. Further, the carboxyl group-containing monomer includes monomers where the carboxyl groups of these monomers foim salt of the carboxylic acid. Furthemore, an anhydride of α,β-ethylenically unsaturated polyvalent carboxylic acid also cleaves the acid anhydride group after copolymerization to foim carboxyl groups, so can be used as the carboxyl group-containing monomer.

As the α,β-ethylenically unsaturated monocarboxylic acid monomer, acrylic acid, methacrylic acid, ethylacrylic acid, crotonic acid, cinnamic acid, etc. may be mentioned.

As the α,β-ethylenically unsaturated polyvalent carboxylic acid monomer, a butenedioic acid such as fumaric acid and maleic acid, itaconic acid, citraconic acid, mesaconic acid, glutaconic acid, allylmalonic acid, teraconic acid, etc. may be mentioned. Further, as an anhydride of α,β-unsaturated polyvalent carboxylic acid, maleic anhydride, itaconic anhydride, citraconic anhydride, etc. may be mentioned.

As the α,β-ethylenically unsaturated dicarboxylic acid diester monomer, a maleic acid diester such as diethyl maleate; a fumaric acid diester such as dimethyl fumarate; a citraconic acid diester such as dimethyl citraconate; an itaconic acid diester such as butyl itaconate; etc. may be mentioned. As the α,β-ethylenically unsaturated dicarboxylic acid mono ester monomer, a maleic acid monoalkyl ester such as monomethyl maleate, monoethyl maleate, monopropyl maleate, and mono-n-butyl maleate; a maleic acid monocycloalkyl ester such as monocyclopentyl maleate, monocyclohexyl maleate, and monocycloheptyl maleate; a maleic acid monoalkylcycloalkyl ester such as monomethylcyclopentyl maleate and monoethylcyclohexyl maleate; a fumaric acid monoalkyl ester such as monomethyl fumarate, monoethyl fumarate, monopropyl fumarate, and mono-n-butyl fumarate; a fumaric acid monocycloalkyl ester such as monocyclopentyl fumarate, monocyclohexyl fumarate, and monocycloheptyl fumarate; a fumaric acid monoalkylcycloalkyl ester such as monomethylcyclopentyl fumarate and monoethylcyclohexyl fumarate; a citraconic acid monoalkyl ester such as monomethyl citraconate, monoethyl citraconate, monopropyl citraconate, and mono-n-butyl citraconate; a citraconic acid monocycloalkyl ester such as monocyclopentyl citraconate, monocyclohexyl citraconate, and monocycloheptyl citraconate; a citraconic acid monoalkylcycloalkyl ester such as monomethylcyclopentyl citraconate and monoethylcyclohexyl citraconate; an itaconic acid monoalkyl ester such as monomethyl itaconate, monoethyl itaconate, monopropyl itaconate, and mono-n-butyl itaconate; an itaconic acid monocycloalkyl ester such as monocyclopentyl itaconate, monocyclohexyl itaconate, and monocycloheptyl itaconate; an itaconic acid monoalkylcycloalkyl ester such as monomethylcyclopentyl itaconate and monoethylcyclohexyl itaconate; etc. may be mentioned.

The carboxyl group-containing monomers may be used as single types alone or as a plurality of types combined. Among these as well, an α,β-ethylenically unsaturated dicarboxylic acid mono ester monomer is preferable, a maleic acid monoalkyl ester is more preferable, and mono-n-butyl maleate is particularly preferable. Note that, as the number of carbon atoms of the alkyl group of the alkyl ester, 2 to 8 is preferable.

In the monomer mixture used in the method of production of the present invention, the amount of use of the carboxyl group-containing monomer may be suitably determined in accordance with the composition of the finally obtained highly saturated nitrile rubber, but it is preferably 1 to 30 wt %, more preferably 2 to 25 wt %, still more preferably 2 to 20 wt %. By making the content of the carboxyl group-containing monomer the above range, it is possible to make the obtained highly saturated nitrile rubber one excellent in fatigue resistance while making it higher in low heat buildup property.

Furthermore, the monomer mixture used in the method of production of the present invention may contain, in addition to the above-mentioned α,β-ethylenically unsaturated nitrile monomer and diene monomer and the carboxyl group-containing monomer able to be used in accordance with need, another monomer able to be copolymerized with these. Such other monomer is not particularly limited, but, for example, an α,β-ethylenically unsaturated monocarboxylic acid ester monomer, nonconjugated diene monomer, aromatic vinyl monomer, cross-linkable monomer, copolymerizable antiaging agent, etc. may be mentioned.

As the α,β-ethylenically unsaturated monocarboxylic acid ester monomer, for example, a (meth)acrylic acid ester (abbreviation for "methacrylic acid ester and acrylic acid ester", same below) having an alkyl group having 1 to 18 carbon atoms such as methyl acrylate, ethyl acrylate, n-butyl acrylate, isobutyl acrylate, n-dodecyl acrylate, methyl methacrylate, and ethyl methacrylate; a (meth)acrylic acid ester having an alkoxyalkyl group having 2 to 12 carbon atoms such as methoxymethyl acrylate, 2-methoxyethyl acrylate, 2-methoxyethyl methacrylate, 3-methoxypropyl acrylate, 4-ethoxybutyl methacrylate, 6-methoxyhexyl acrylate, 4-ethoxyheptyl methacrylate, and 8-methoxyoctyl acrylate; a (meth)acrylic acid ester having a cyanoalkyl group having 2 to 12 carbon atoms such as α-cyanoethyl acrylate, α-cyanoethyl methacrylate, and cyanobutyl methacrylate; a (meth)acrylic acid ester having a hydroxyalkyl group having 1 to 12 carbon atoms such as 2-hydroxyethyl acrylate, 2-hydroxypropyl acrylate, and 2-hydroxyethyl methacrylate; a (meth)acrylic acid ester having a fluoroalkyl group having 1 to 12 carbon atoms such as trifluoroethyl acrylate and tetrafluoropropyl methacrylate; etc. may be mentioned.

As the nonconjugated diene monomer, one having 5 to 12 carbon atoms is preferable. For example, 1,4-pentadiene, 1,4-hexadiene, vinylnorbornene, dicyclopentadiene, etc. may be mentioned.

As the aromatic vinyl monomer, for example, styrene, α-methylstyrene, vinylpyridine, etc. may be mentioned.

As the cross-linkable monomer, for example, a polyfunctional ethylenically unsaturated monomer such as a divinyl compound such as divinylbenzene; a di(meth)acrylic acid ester such as ethylene di(meth)acrylate, diethyleneglycol di(meth)acrylate, and ethyleneglycol di(meth)acrylate; and a trimethacrylic acid ester such as trimethylolpropane tri(meth)acrylate and also a self-cross-linkable monomer such as N-methylol (meth)acrylamide, N,N'-dimethylol (meth)acrylamide, etc. may be mentioned.

As the copolymerizable antiaging agent, for example, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, etc. may be mentioned.

These other copolymerizable monomers may be used in a plurality of types together. In the monomer mixture used in the method of production of the present invention, the amount of use of the other copolymerizable monomer may be suitably determined in accordance with the composition of the finally obtained highly saturated nitrile rubber, but is preferably 50 wt % or less, more preferably 30 wt % or less, still more preferably 10 wt % or less.

In the polymerization step in the method of production of the present invention, the above-mentioned monomer mixture is polymerized in a medium to obtain a dispersion or solution of the nitrile rubber. The monomer mixture can be polymerized by, for example, the emulsion polymerization method or solution polymerization method, but in the case of using the emulsion polymerization method, it is possible to obtain an aqueous dispersion of the nitrile rubber, while in the case of using the solution polymerization method, it is possible to obtain a solution of the nitrile rubber. Among these as well, from the viewpoint of industrial productivity, the emulsion polymerization method is preferable. At the time of emulsion polymerization, in addition to an emulsifying agent, polymerization initiator, and molecular weight adjuster, a normally used secondary polymerization material can be used.

The emulsifying agent is not particularly limited, but, for example, a nonionic emulsifying agent such as a polyoxyethylenealkyl ether, polyoxyethylenealkylphenol ether, polyoxyethylenealkyl ester, and polyoxyethylenesorbitanalkyl ester; an anionic emulsifying agent such as a salt of a fatty acid such as myristic acid, palmitic acid, oleic acid, and linolenic acid, an alkylbenzene sulfonate such as sodium dodecylbenzene sulfonate, a higher alcohol sulfuric acid ester salt, and an alkylsulfosuccinic acid salt; a copolymerizable emulsifying agent such as a sulfo ester of an α,β-unsaturated carboxylic acid, a sulfate ester of an α,β-unsaturated carboxylic acid, and a sulfoalkylaryl ether; etc.

may be mentioned. The amount of addition of the emulsifying agent is preferably 0.1 to 10 parts by weight with respect to 100 parts by weight of the monomer mixture used for the polymerization, more preferably 0.5 to 5 parts by weight.

The polymerization initiator is not particularly limited so long as a radical initiator, but an inorganic peroxide such as potassium persulfate, sodium persulfate, ammonium persulfate, potassium peiphosphate, and hydrogen peroxide; an organic peroxide such as t-butyl peroxide, cumen hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butyl peroxyisobutyrate; an azo compound such as azobisisobutyronitrile, azobis-2,4-dimethylvaleronitrile, azobiscyclohexane carbonitrile, and dimethyl azobisisobutyrate; etc. may be mentioned. The polymerization initiator may be used alone or as two types or more combined. As the polymerization initiator, an inorganic or organic peroxide is preferable. When using a peroxide as the polymerization initiator, it may be combined with a reducing agent such as sodium bisulfite and ferrous sulfate as a redox type polymerization initiator. The amount of addition of the polymerization initiator is preferably 0.01 to 2 parts by weight with respect to 100 parts by weight of the monomer mixture used for the polymerization.

The molecular weight adjuster is not particularly limited, but a compound having a mercapto group can be preferably used. For example, a compound having a mercapto group having 9 to 12 carbon atoms such as 2,2,4,6,6-pentamethyl-4-heptanethiol, 2,4,4,6,6-pentamethyl-2-heptanethiol, 2,3,4,6,6-pentamethyl-2-heptanethiol, and 2,3,4,6,6-pentamethyl-3-heptanethiol; a compound having a mercapto group having 13 to 16 carbon atoms such as 2,2,4,6,6-pentamethyl-4-octanethiol and 2,2,4,6,6,8,8-heptamethyl-4-nonanethiol; and also t-dodecylmercaptan (mixture of compounds having mercapto group having 9 to 16 carbon atoms) etc. may be mentioned. Further, together with these compounds having mercapto group or instead of them, a halogenated hydrocarbon such as carbon tetrachloride, methylene chloride, and methylene bromide; α-methylstyrene dimer; a sulfur-containing compound such as tetraethyl thiuram disulfide, dipentamethylene thiuram disulfide, and diisopropyl xanthogen disulfide; etc. may be used. These may be used alone or as two types or more combined. The amount of addition of the molecular weight adjuster is preferably 0.01 to 2 parts by weight with respect to 100 parts by weight of the monomer mixture used for the polymerization, more preferably 0.05 to 1 part by weight.

For the medium of the emulsion polymerization, usually water is used. The amount of water is preferably 80 to 500 parts by weight with respect to 100 parts by weight of the monomer used for the polymerization, more preferably 80 to 300 parts by weight.

At the time of emulsion polymerization, furthermore it is possible in accordance with need to use a secondary polymerization material such as a stabilizer, dispersant, pH adjuster, deoxidant, and particle size adjuster. When using these, the types and amounts of use are not particularly limited.

Further, in the method of production of the present invention, it is also possible to adopt a configuration further including a step, after causing the monomer mixture to polymerize, of heating the dispersion or solution of the nitrile rubber obtained by causing the monomer mixture to polymerize in the presence of a basic compound so as to cause the unreacted monomers (for example, α,β-ethylenically unsaturated nitrile monomer) and molecular weight adjuster such as the compound having a mercapto group used for the polymerization reaction to react and thereby reduce the residual amount of the molecular weight adjuster such as the compound having a mercapto group.

The basic compound used at this time is not particularly limited, but a known inorganic and/or organic basic compound may be mentioned. Among these as well, an inorganic basic compound such as an alkali metal compound and alkali earth metal compound is suitable.

The amount of use of the basic compound is not particularly limited, but is preferably made 0.1 to 2 parts by weight in range with respect to 100 parts by weight of the nitrile rubber obtained by polymerization. By making the amount of use of the basic compound the above range, it is possible to effectively reduce the residual amount of the molecular weight adjuster such as a compound having a mercapto group.

As the alkali metal compound, for example, a hydroxide such as lithium hydroxide, sodium hydroxide, and potassium hydroxide; a carbonate compound such as lithium carbonate, sodium carbonate, and potassium carbonate; a hydrogen carbonate compound such as lithium hydrogen carbonate, sodium hydrogen carbonate, and potassium hydrogen carbonate; an oxide such as lithium oxide, potassium oxide, and sodium oxide; a fatty acid salt compound such as potassium acetate and sodium acetate; an alkoxide such as lithium methoxide, lithium ethoxide, sodium methoxide, sodium ethoxide, and potassium t-butoxide; a phenoxide such as sodium phenoxide and potassium phenoxide; etc. may be mentioned. Preferably it is a hydroxide, carbonate compound, or hydrogen carbonate compound of an alkali metal, more preferably a hydroxide.

As the alkali earth metal compound, for example, a hydroxide, carbonate compound, hydrogen carbonate compound, oxide, fatty acid salt compound, alkoxide, phenoxide, etc. of an alkali earth metal such as magnesium, calcium, strontium, and barium may be mentioned. Preferably it is a hydroxide, carbonate compound, or hydrogen carbonate compound of an alkali earth metal, more preferably a hydroxide.

Such a basic compound may be used as is or may be diluted by or dissolved in water or an organic solvent for use. The basic compound may be used alone or as two types or more combined.

The heating temperature when heating the dispersion or solution of the nitrile rubber in the presence of the basic compound is preferably 30 to 80° C., more preferably 40 to 70° C. Further, the heating method at this time is not particularly limited, but usually can include use of a heating means such as a jacket or heating medium coil attached to the wall surface or inside of the reactor, but the heat of polymerization at the time of polymerization may also be utilized.

Further, in the method of production of the present invention, it is also possible to perform an operation to remove the unreacted monomer in accordance with need after causing the monomer mixture to polymerize or, in accordance with need, after the step of heating the dispersion or solution of the nitrile rubber in the presence of the basic compound.

<Coagulation Step>

The coagulation step in the method of production of the present invention is the step of causing the dispersion or solution of the nitrile rubber obtained in the above polymerization step to coagulate at 10 to 60° C. to obtain solid form nitrile rubber.

For example, when performing polymerization in the above-mentioned polymerization step by the emulsion polymerization method and obtaining an aqueous dispersion of the nitrile rubber, as the method of coagulation in the coagulation step of the method of production of the present invention, coagulation by salting out using a known coagulant such as sodium chloride, calcium chloride, and aluminum sulfate etc. may be mentioned. Alternatively, instead of coagulation by salting out, an alcohol such as methanol may also be used for coagulation. Further, when performing polymerization in the above-mentioned polymerization step by the solution polymerization method and obtaining a solution of the nitrile rubber, water etc. may be used for coagulation.

Further, in the coagulation step of the method of production of the present invention, the temperature at the time of coagulation is made 10 to 60° C., preferably 20 to 50° C., more preferably 25 to 50° C. By coagulating the dispersion or solution of the nitrile rubber obtained by the polymerization step at the above temperature range, it is possible to reduce the amount of residual organic acid in the nitrile rubber obtained by coagulation. Due to this, it is possible to suitably raise the reactivity of the hydrogenation reaction in the later explained hydrogenation reaction. On the other hand, if the temperature at the time of coagulation is too low or if conversely is too high, the amount of residual organic acid in the nitrile rubber obtained by coagulation ends up becoming too great and the reactivity of the hydrogenation reaction in the later explained hydrogenation reaction step ends up becoming lower. Note that, the amount of residual organic acid in the nitrile rubber obtained by coagulation is not particularly limited, but is preferably 15 wt % or less, more preferably 10 wt % or less. The amount of residual organic acid can, for example, be measured by the method of titrating the component extracted using the organic solvent in the nitrile-group containing copolymer rubber by an alkali solution. Note that, as the method of making the amount of residual organic acid the above range, in addition to making the coagulation temperature in the coagulation step the above range, the method of strengthening the washing in the washing step etc. may be mentioned.

<Hydrogenation Reaction Step>

The hydrogenation reaction step in the method of production of the present invention is the step of causing the solid form nitrile rubber obtained by the above-mentioned coagulation step to disperse or dissolve in a medium to obtain a dispersion or solution of the nitrile rubber, and performing a hydrogenation reaction of the obtained dispersion or solution of the nitrile rubber to thereby obtain a dispersion or solution of a highly saturated nitrile rubber. The hydrogenation reaction is performed in the method of production of the present invention under the following conditions.

That is, the content of a compound having a mercapto group having 9 to 12 carbon atoms is adjusted to 50 wt ppm or less and the content of a compound having a mercapto group having 13 to 16 carbon atoms is adjusted to 1 to 120 wt ppm with respect to 100 wt % of the content of the nitrile rubber in the dispersion or solution of the nitrile rubber, and the hydrogenation reaction is performed in the state with these contents in such ranges. Note that, in the present invention, the "hydrogenation reaction" means a reaction for hydrogenating at least part of the carbon-carbon double bonds in the nitrile rubber to convert them to carbon-carbon saturated bonds, but the hydrogenation rate is not particularly limited.

In the method of production of the present invention, by making the content of the compound having a mercapto group having 9 to 12 carbon atoms and the content of the compound having a mercapto group having 13 to 16 carbon atoms the above ranges and performing the hydrogenation reaction in that state, it is possible to raise the reactivity in the hydrogenation reaction. Due to this, it is possible to suitably obtain a highly saturated nitrile rubber raised in hydrogen conversion rate. In particular, in the method of production of the present invention, even when making the amount of the hydrogenation catalyst a relatively small amount of use of preferably 10 to 1000 wt ppm with respect to 100 wt % of the nitrile rubber before hydrogenation, more preferably 10 to 800 wt ppm, it is possible to make the reactivity in the hydrogenation reaction a high rate. Due to this, it is possible to suitably obtain a highly saturated nitrile rubber raised in hydrogen conversion rate.

In the method of production of the present invention, when performing the hydrogenation reaction, the content of the compound having a mercapto group having 9 to 12 carbon atoms is 50 wt ppm or less with respect to 100 wt % of the content of the nitrile rubber in the dispersion or solution of the nitrile rubber, preferably 40 wt ppm or less, more preferably 30 wt ppm or less. Further, the lower limit is not particularly limited, but is usually 0.1 wt ppm or more. If the content of the compound having a mercapto group having 9 to 12 carbon atoms is too great, the effect of improvement of the reactivity in the hydrogenation reaction ends up becoming unable to be obtained.

Further, in the method of production of the present invention, when performing the hydrogenation reaction, the content of the compound having a mercapto group having 13 to 16 carbon atoms is 1 to 120 wt ppm with respect to 100 wt % of the content of the nitrile rubber in the dispersion or solution of the nitrile rubber, preferably 1 to 100 wt ppm, more preferably 1 to 90 wt ppm. If the content of the compound having a mercapto group having 13 to 16 carbon atoms is too small or too large, the effect of improvement of the reactivity in the hydrogenation reaction ends up becoming unable to be obtained.

In the method of production of the present invention, as the method of making the content of the compound having a mercapto group having 9 to 12 carbon atoms and the content of the compound having a mercapto group having 13 to 16 carbon atoms the above ranges in the dispersion or solution of the nitrile rubber at the time of performing the hydrogenation reaction is not particularly limited, but the method of causing the solid form nitrile rubber obtained in the above-mentioned coagulation step to disperse or dissolve in a medium and adding these compounds to give contents in the above ranges may be mentioned. Note that, at this time, when using, in the above-mentioned polymerization step, a molecular weight adjuster comprised of the compound having a mercapto group having 9 to 12 carbon atoms or the compound having a mercapto group having 13 to 16 carbon atoms, these compounds may be added by considering the contents of these compounds contained in the nitrile rubber after coagulation.

Further, in the method of production of the present invention, when performing a hydrogenation reaction of the nitrile rubber, it is also possible to employ an aqueous layer hydrogenation method of causing the solid form nitrile rubber obtained by the above-mentioned coagulation step to disperse in water and hydrogenating it in the aqueous layer or employ an oil layer hydrogenation method of causing the solid form nitrile rubber obtained by the above-mentioned coagulation step to dissolve in a solvent and hydrogenating it in the oil layer.

The solvent in the oil layer hydrogenation method is not particularly limited so long as a liquid organic compound dissolving nitrile rubber, but benzene, chlorobenzene, toluene, xylene, hexane, cyclohexane, tetrahydrofuran, methylethylketone, ethyl acetate, cyclohexanone, acetone, etc. are preferably used.

The aqueous layer hydrogenation method includes the aqueous layer direct hydrogenation method of supplying hydrogen to the reaction system in the presence of a hydrogenation catalyst for hydrogenation and the aqueous layer indirect hydrogenation method of reduction in the presence of an oxidizing agent, reducing agent, and activating agent for hydrogenation may be mentioned. Among these as well, the aqueous layer direct hydrogenation method is preferable.

The hydrogenation catalyst used for the hydrogenation reaction is not particularly limited, but usually a metal belonging to Group VIII of the Periodic Table or a metal compound of the same may be used. Among the elements belonging to Group VIII of the Periodic Table, a platinum group element such as ruthenium, rhodium, palladium, osmium, iridium, and platinum is preferable. Among these as well, palladium and rhodium are more preferable, while palladium is particularly preferable. The hydrogenation catalyst may also use two or more kinds selected from metals belonging to Group VIII of the Periodic Table and metal compounds of the same. In this case as well, the palladium is preferably made the main active component.

Further, the hydrogenation catalyst may include a metal component other than a metal belonging to Group VIII of the Periodic Table. As such a component, silver, copper, gold, tellurium, zinc, chromium, molybdenum, tin, bismuth, lead, etc. may be mentioned. In general, in alloy catalysts, it is said that characteristics of the component elements appear according to the alloy composition. The amount of the added metal component is 0.01 to 100 parts by weight with respect to 100 parts by weight of the Group VIII metal of the Periodic Table, more preferably 0.1 to 10 parts by weight.

The hydrogenation catalyst may be used as a nonsupported type (homogeneous) catalyst rather than being affixed on a support. Alternatively, it may also be used as a supported type (heterogeneous) catalyst affixed to a known catalyst support such as activated carbon, activated clay, alumina gel, silica gel, and diatomaceous earth. In this case, the amount of the metal component supported is usually 0.5 to 80 wt %, preferably 1 to 50 wt %, more preferably 2 to 30 wt %.

The catalyst metal ingredient may be affixed on a support by a known method. For example, the impregnation method, coating method, spray method, adsorption method, precipitation method, etc., may be mentioned. It is also possible to affix the metal component on a support, then foim it into suitable shapes, for example, spheres, columns, prisms, or a honeycomb, in accordance with the type of reactor using that support or the type of reaction.

When using a hydrogenation catalyst comprised of a palladium-based catalyst (palladium and/or palladium compound), as the palladium compound, usually a II-valent or IV-valent palladium compound is used. The form may be any of a salt, complex salt, and complex, for example, an organic acid salt such as palladium acetate and palladium cyanate; a halide such as palladium fluoride, palladium chloride, palladium bromide, and palladium iodide; an oxoacid salt such as palladium nitrate and palladium sulfate; palladium oxide; palladium hydroxide; a complex salt or complex such as dichlorocyclooctadiene palladium, dichloronorbornadiene palladium, tetrakis acetonitrile palladium tetrafluoroborate, tetrakisbenzonitrile palladium ditetrafluoroborate, dichlorobisacetonitrile palladium, dichlorobisethylenediamine palladium, bisacetyl acetonate palladium, tristriphenylphosphine acetonitrile palladium tetrafluoroborate, dichlorobistriethylphosphine palladium, dichlorobis(dimethylsulfide) palladium, dibenzoylsulfide palladium, bis(2, 2'-bipyridine)palladium perchlorate, and tetrakis(pyridine) palladium dichloride; etc. may be mentioned.

These palladium compounds may be commercially available ones acquired for use. Further, ones prepared in accordance with the method described in "New Experimental Chemistry", vols. 8 and 12 (Maruzen, 1976) or "Chemistry and Application of Precious Metals" (Kodansha Scientific, 1984) etc. may also be used.

The reaction temperature of the hydrogenation reaction is usually 0° C. to 200° C., preferably 5° C. to 150° C., more preferably 10 to 100° C. If making the reaction temperature excessively high, a secondary reaction such as hydrogenation of the nitrile group occurs and the reaction medium is hydrogenated, so this is not preferable. Further, if making the reaction temperature excessively low, the reaction speed falls and becomes impractical.

The pressure of the hydrogen of the hydrogenation reaction is usually atmospheric pressure to 20 MPa, preferably atmospheric pressure to 15 MPa, more preferably atmospheric pressure to 10 MPa. The reaction time is not particularly limited, but is usually 30 minutes to 50 hours.

After the end of the hydrogenation reaction, the method of recovering (isolating) the highly saturated nitrile rubber from the obtained dispersion or solution of the highly saturated nitrile rubber is not particularly limited, but it is sufficient to suitably employ a method usually used industrially. For example, the steam coagulation method of bringing the dispersion or solution of the highly saturated nitrile rubber directly into contact with steam, the method of dropping the dispersion or solution of the highly saturated nitrile rubber on a heated rotary drum to make the medium evaporate, the direct drying method of making the medium in the dispersion or solution of the highly saturated nitrile rubber evaporate under reduced pressure, etc. may be mentioned. The separated highly saturated nitrile rubber is recovered as solid highly saturated nitrile rubber through a drying step such as hot air drying, reduced pressure drying, and extruded drying.

According to the method of production of the present invention, even when making the amount of the hydrogenation catalyst a relatively small amount of use of preferably 10 to 1000 wt ppm with respect to 100 wt % of the nitrile rubber before hydrogenation, more preferably 10 to 800 wt ppm, it is possible to make the reactivity in the hydrogenation reaction a high one and as a result it is possible to reduce the amount of the hydrogenation catalyst used in the hydrogenation reaction while suitably obtaining a highly saturated nitrile rubber raised in hydrogen conversion rate (preferably, a highly saturated nitrile rubber with a hydrogen conversion rate raised to 50% or more, more preferably 70% or more, particularly preferably 80% or more). Further, the highly saturated nitrile rubber obtained by such a method of production of the present invention has an iodine value of preferably 80 or less, more preferably 50 or less, and is excellent in various properties such as weather resistance, ozone resistance, heat resistance, and cold resistance, so can be used for a broad range of industrial applications. The iodine value referred to here is the value measured based on JIS K 6235.

EXAMPLES

Below, the present invention will be explained further by detailed examples, but the present invention is not limited to these examples. Note that, below, "parts" are based on weight unless otherwise indicated. Further, the tests and evaluations were performed as follows:

Content of Compound Having Mercapto Group Having 9 to 12 Carbon Atoms and Content of Compound Having Mercapto Group Having 13 to 16 Carbon Atoms Contained in Nitrile Rubber In accordance with JIS K6229, methanol extraction was performed to the nitrile rubber. Further, the obtained extract was dissolved in chloroform, was measured for peak area by gas chromatography based on JIS K0114 and JIS K6231, and was measured by the calibration line method using mercaptan having 9 to 12 carbon atoms for the content of the compound having a mercapto group having 12 or less carbon atoms and the content of the compound having a mercapto group having 13 to 16 carbon atoms in the nitrile rubber.

Note that, the measurement conditions for measurement by gas chromatography were as follows:

Separation column: DB1 (length 30 m, inside diameter 0.25 mm, and thickness 1.0 μm)

Elevation temperature of column oven: held at 50° C. for 2 minutes, then raised by 10° C./min until 280° C.

Injection temperature: 280° C.

Detector temperature: 280° C.

Measurement of Amount of Residual Organic Acid Contained in Nitrile Rubber

Based on JIS K6237 "Determination of Soap and Organic-Acid Content of Raw Rubber-SBR", ETA extraction was performed to the nitrile rubber composition. The obtained extract was titrated by a 0.1 mol/liter sodium hydroxide aqueous solution to measure the amount of residual organic acid in the nitrile rubber.

Synthesis Example 1 (Production of Latex of Nitrile Rubber (A1))

To 200 parts of ion exchanged water in a reactor, 0.2 part of sodium carbonate was dissolved. Next, 2.25 part of a fatty acid potassium soap (potassium salt of fatty acid) was added to prepare a soap aqueous solution. Further, to the obtained soap aqueous solution, 38 parts of acrylonitrile and 0.5 part of 2,2,4,6,6-pentamethyl-4-heptanethiol (compound having mercapto group having 12 carbon atoms) as a molecular weight adjuster were charged in that order, the inside gas was replaced with nitrogen three times, then the inside was charged with 62 parts of 1,3-butadiene. Next, while holding inside temperature of the reactor at 5° C., 0.1 part of cumen hydroperoxide (polymerization initiator) and suitable amounts of a reducing agent and chelating agent were charged and the polymerization reaction started. Further, at the time that the polymerization conversion rate became 90%, 0.1 part of a concentration 10 wt % hydroquinone (polymerization terminator) aqueous solution was added to stop the polymerization reaction. Next, the obtained polymerization reaction solution was stirred at 30° C. for 3 hours, the unreacted butadiene was removed, then the polymerization reaction solution was warmed to 50° C., a potassium hydroxide 2.5 wt % aqueous solution was added to give an amount of addition of potassium hydroxide of 0.5 part with respect to 100 parts of the copolymer contained in the polymerization reaction solution and was stirred for 3 hours, then a rotary evaporator of a water temperature 60° C. was used to concentrate this in vacuo to obtain a latex of nitrile rubber (A1). The content of the compound having a mercapto group having 9 to 12 carbon atoms was 20.0 wt ppm and the content of the compound having a mercapto group having 13 to 16 carbon atoms was 0 wt ppm with respect to 100 wt % of nitrile rubber forming the latex of nitrile rubber (A1).

Synthesis Example 2 (Production of Latex (A2) of Nitrile Rubber)

To 200 parts of ion exchanged water in a reactor, 0.2 part of sodium carbonate was dissolved. Next, 2.25 part of a fatty acid potassium soap (potassium salt of fatty acid) was added to prepare a soap aqueous solution. Further, to the obtained soap aqueous solution, 38 parts of acrylonitrile and 0.5 part of t-dodecylmercaptan (mixture of compounds having mercapto group having 9 to 16 carbon atoms) as a molecular weight adjuster were charged in that order, the inside gas was replaced with nitrogen three times, then the inside was charged with 62 parts of 1,3-butadiene. Next, while holding inside temperature of the reactor at 5° C., 0.1 part of cumen hydroperoxide (polymerization initiator) and suitable amounts of a reducing agent and chelating agent were charged and the polymerization reaction started. Further, at the time that the polymerization conversion rate became 90%, 0.1 part of a concentration 10 wt % hydroquinone (polymerization terminator) aqueous solution was added to stop the polymerization reaction. Next, the obtained polymerization reaction solution was stirred at 30° C. for 3 hours, the unreacted butadiene was removed, then the polymerization reaction solution was warmed to 50° C., a potassium hydroxide 2.5 wt % aqueous solution was added to give an amount of addition of potassium hydroxide of 0.5 part with respect to 100 parts of the copolymer contained in the polymerization reaction solution and was stirred for 3 hours, then a rotary evaporator of a water temperature 60° C. was used to concentrate this in vacuo to obtain a latex of nitrile rubber (A2). The content of the compound having a mercapto group having 9 to 12 carbon atoms was 13.5 wt ppm and the content of the compound having a mercapto group having 13 to 16 carbon atoms was 0.5 wt ppm with respect to 100 wt % of nitrile rubber forming the latex of nitrile rubber (A2).

Synthesis Example 3 (Production of Latex of Nitrile Rubber (A3))

To 200 parts of ion exchanged water in a reactor, 0.2 part of sodium carbonate was dissolved. Next, 2.25 part of a fatty acid potassium soap (potassium salt of fatty acid) was added to prepare a soap aqueous solution. Further, to the obtained soap aqueous solution, 38 parts of acrylonitrile, and 0.1 part of 2,2,4,6,6-pentamethyl-4-heptanethiol (compound having mercapto group having 12 carbon atoms) and 0.3 part of 2,2,4,6,6-pentamethyl-4-octanethiol (compound having mercapto group having 13 carbon atoms) as a molecular weight adjuster were charged in that order, the inside gas was replaced with nitrogen three times, then the inside was charged with 62 parts of 1,3-butadiene. Next, while holding inside temperature of the reactor at 5° C., 0.1 part of cumen hydroperoxide (polymerization initiator) and suitable amounts of a reducing agent and chelating agent were charged and the polymerization reaction started. Further, at the time that the polymerization conversion rate became 90%, 0.1 part of a concentration 10 wt % hydroquinone (polymerization terminator) aqueous solution was added to stop the polymerization reaction. Next, the obtained polymerization reaction solution was stirred at 30° C. for 3 hours, the unreacted butadiene was removed, then a rotary evaporator of a water temperature of 60° C. was used to concentrate the solution in vacuo to obtain the latex of nitrile rubber (A3). The content of the compound having a mercapto group having 9 to 12 carbon atoms was 15.0 wt ppm and the content of the compound having a mercapto group having 13 to 16 carbon atoms was 45.0 wt ppm with respect to 100 wt % of nitrile rubber forming the latex of nitrile rubber (A3).

Synthesis Example 4 (Production of Latex of Nitrile Rubber (A4))

To 200 parts of ion exchanged water in a reactor, 0.2 part of sodium carbonate was dissolved. Next, 2.25 part of a fatty acid potassium soap (potassium salt of fatty acid) was added to prepare a soap aqueous solution. Further, to the obtained soap aqueous solution, 38 parts of acrylonitrile, and 0.5 part of t-dodecylmercaptan (mixture of compounds having mercapto group having 9 to 16 carbon atoms) as a molecular weight adjuster were charged in that order, the inside gas was replaced with nitrogen three times, then the inside was charged with 62 parts of 1,3-butadiene. Next, while holding inside temperature of the reactor at 5° C., 0.1 part of cumen hydroperoxide (polymerization initiator) and suitable amounts of a reducing agent and chelating agent were charged and the polymerization reaction started. Further, at the time that the polymerization conversion rate became 90%, 0.1 part of a concentration 10 wt % hydroquinone (polymerization terminator) aqueous solution was added to stop the polymerization reaction. Next, the obtained polymerization reaction solution was stirred at 30° C. for 3 hours, the unreacted butadiene was removed, then a rotary evaporator of a water temperature of 60° C. was used to concentrate the solution in vacuo to obtain the latex of nitrile rubber (A4). The content of the compound having a mercapto group having 9 to 12 carbon atoms was 77.0 wt ppm and the content of the compound having a mercapto group having 13 to 16 carbon atoms was 3.0 wt ppm with respect to 100 wt % of nitrile rubber forming the latex of nitrile rubber (A4).

Example 1

An aqueous solution of aluminum sulfate was prepared in an amount of aluminum sulfate of 3 wt % with respect to the amount of nitrile rubber contained in the latex of nitrile rubber (A1) obtained in Synthesis Example 1. This was warmed to 30° C., then the latex of nitrile rubber (A1) obtained in Synthesis Example 1 was added to the aqueous solution of aluminum sulfate and stirred at a temperature of 30° C. to cause it to coagulate. This was then rinsed with water while filtering, then was dried in vacuo at 60° C. for 12 hours to obtain the solid foam nitrile rubber (A1-1). The amount of residual organic acid of the nitrile rubber (A1-1) was 7 wt %.

Further, the obtained nitrile rubber (A1-1) was dissolved in acetone to a concentration of 12 wt % to thereby obtain an acetone solution of nitrile rubber (A1-1). This was placed in an autoclave, 200 wt ppm of a palladium-silica catalyst and 20 wt ppm of 2,2,4,6,6-pentamethyl-4-octanethiol (compound having mercapto group having 13 carbon atoms) were added with respect to 100 wt % of nitrile rubber (A1-1), then a hydrogenation reaction was performed at a hydrogen pressure of 3.0 MPa for 6 hours. After the end of the hydrogenation reaction, the solution was poured into a large amount of water to cause it to coagulate and was filtered and dried to obtain a highly saturated nitrile rubber. The obtained highly saturated nitrile rubber was measured by $^1$H-NMR for the hydrogenation rate, whereby the hydrogenation rate was 95%.

Example 2

An acetone solution of nitrile rubber (A1-1) was obtained as in Example 1. Then, except for changing the amount of 2,2,4,6,6-pentamethyl-4-octanethiol (compound having mercapto group having 13 carbon atoms) added to the acetone solution of the nitrile rubber (A1-1) from 20 wt ppm to 80 wt ppm, the same procedure was followed as in Example 1 to perform a hydrogenation reaction to obtain a highly saturated nitrile rubber. The obtained highly saturated nitrile rubber was measured by $^1$H-NMR for hydrogenation rate, whereby the hydrogenation rate was 90%.

Example 3

An acetone solution of nitrile rubber (A1-1) was obtained as in Example 1. Then, except for adding 20 wt ppm of 2,2,4,6,6,8,8-heptamethyl-4-nonanethiol (compound having mercapto group having 16 carbon atoms) instead of 20 wt ppm of 2,2,4,6,6-pentamethyl-4-octanethiol (compound having mercapto group having 13 carbon atoms) to the acetone solution of nitrile rubber (A1-1), the same procedure was followed as in Example 1 to perform a hydrogenation reaction to obtain a highly saturated nitrile rubber. The obtained highly saturated nitrile rubber was measured by $^1$H-NMR for hydrogenation rate, whereby the hydrogenation rate was 96%.

Example 4

An aqueous solution of aluminum sulfate was prepared in an amount of aluminum sulfate of 3 wt % with respect to the amount of nitrile rubber contained in the latex of nitrile rubber (A2) obtained in Synthesis Example 2. This was warmed to 30° C., then the latex of nitrile rubber (A2) obtained in Synthesis Example 2 was added to the aqueous solution of aluminum sulfate and stirred at a temperature of 30° C. to cause it to coagulate. This was then rinsed with water while filtering, then was dried in vacuo at 60° C. for 12 hours to obtain the solid foam nitrile rubber (A2-1). The amount of residual organic acid of the nitrile rubber (A2-1) was 7 wt %.

Further, the obtained nitrile rubber (A2-1) was dissolved in acetone to a concentration of 12 wt % to thereby obtain an acetone solution of nitrile rubber (A2-1). This was placed in an autoclave, 200 wt ppm of a palladium-silica catalyst and 5 wt ppm of 2,2,4,6,6-pentamethyl-4-octanethiol (compound having mercapto group having 13 carbon atoms) was added with respect to 100 wt % of nitrile rubber (A2-1), then a hydrogenation reaction was performed at a hydrogen pressure of 3.0 MPa for 6 hours. After the end of the hydrogenation reaction, the solution was poured into a large amount of water to cause it to coagulate and was filtered and dried to obtain a highly saturated nitrile rubber. The obtained highly saturated nitrile rubber was measured by $^1$H-NMR for hydrogenation rate, whereby the hydrogenation rate was 90%.

Example 5

An acetone solution of nitrile rubber (A2-1) was obtained as in Example 4. Then, except for changing the amount of 2,2,4,6,6-pentamethyl-4-octanethiol (compound having mercapto group having 13 carbon atoms) added to the acetone solution of the nitrile rubber (A2-1) from 5 wt ppm to 50 wt ppm, the same procedure was followed as in Example 4 to perform hydrogenation reaction to obtain a highly saturated nitrile rubber. The obtained highly saturated nitrile rubber was measured by $^1$H-NMR for hydrogenation rate, whereby the hydrogenation rate was 95%.

Example 6

An aqueous solution of aluminum sulfate was prepared in an amount of aluminum sulfate of 3 wt % with respect to the amount of nitrile rubber contained in the latex of nitrile rubber (A3) obtained in Synthesis Example 3. This was warmed to 30° C., then the latex of nitrile rubber (A3) obtained in Synthesis Example 3 was added to the aqueous solution of aluminum sulfate and stirred at a temperature of 30° C. to cause it to coagulate. This was then rinsed with water while filtering, then was dried in vacuo at 60° C. for 12 hours to obtain the solid foam nitrile rubber (A3-1). The amount of residual organic acid of the nitrile rubber (A3-1) was 7 wt %.

Further, the obtained nitrile rubber (A3-1) was dissolved in acetone to a concentration of 12 wt % to thereby obtain an acetone solution of nitrile rubber (A3-1). This was placed in an autoclave, 200 wt ppm of a palladium-silica catalyst was added with respect to 100 wt % of nitrile rubber (A3-1), then a hydrogenation reaction was performed at a hydrogen pressure of 3.0 MPa for 6 hours. After the end of the hydrogenation reaction, the solution was poured into a large amount of water to cause it to coagulate and was filtered and dried to obtain a highly saturated nitrile rubber. The obtained highly saturated nitrile rubber was measured by $^1$H-NMR for hydrogenation rate, whereby the hydrogenation rate was 95%.

Comparative Example 1

An acetone solution of nitrile rubber (A1-1) was obtained as in Example 1. Then, except for not adding 2,2,4,6,6-pentamethyl-4-octanethiol (compound having mercapto group having 13 carbon atoms) to the acetone solution of the nitrile rubber (A1-1), the same procedure was followed as in Example 1 to perform a hydrogenation reaction to obtain a highly saturated nitrile rubber. The obtained highly saturated nitrile rubber was measured by $^1$H-NMR for hydrogenation rate, whereby the hydrogenation rate was 70%.

Comparative Example 2

An acetone solution of nitrile rubber (A1-1) was obtained as in Example 1. Then, except for changing the amount of 2,2,4,6,6-pentamethyl-4-octanethiol (compound having mercapto group having 13 carbon atoms) added to the acetone solution of the nitrile rubber (A1-1) from 20 wt ppm to 140 wt ppm, the same procedure was followed as in Example 1 to perform a hydrogenation reaction to obtain a highly saturated nitrile rubber. The obtained highly saturated nitrile rubber was measured by $^1$H-NMR for hydrogenation rate, whereby the hydrogenation rate was 65%.

Comparative Example 3

An acetone solution of nitrile rubber (A2-1) was obtained as in Example 4. Then, except for not adding 2,2,4,6,6-pentamethyl-4-octanethiol (compound having mercapto group having 13 carbon atoms) to the acetone solution of the nitrile rubber (A2-1), the same procedure was followed as in Example 4 to perform a hydrogenation reaction to obtain a highly saturated nitrile rubber. The obtained highly saturated nitrile rubber was measured by $^1$H-NMR for hydrogenation rate, whereby the hydrogenation rate was 75%.

Comparative Example 4

An aqueous solution of aluminum sulfate was prepared in an amount of aluminum sulfate of 3 wt % with respect to the amount of nitrile rubber contained in the latex of nitrile rubber (A4) obtained in Synthesis Example 4. This was warmed to 30° C., then the latex of nitrile rubber (A4) obtained in Synthesis Example 4 was added to the aqueous solution of aluminum sulfate and stirred at a temperature of 30° C. to cause it to coagulate. This was then rinsed with water while filtering, then was dried in vacuo at 60° C. for 12 hours to obtain the solid foim nitrile rubber (A4-1). The amount of residual organic acid of the nitrile rubber (A4-1) was 7 wt %.

Further, the obtained nitrile rubber (A4-1) was dissolved in acetone to a concentration of 12 wt % to thereby obtain an acetone solution of nitrile rubber (A4-1). This was placed in an autoclave, 200 wt ppm of a palladium-silica catalyst was added with respect to 100 wt % of nitrile rubber (A4-1), then a hydrogenation reaction was performed at a hydrogen pressure of 3.0 MPa for 6 hours. After the end of the hydrogenation reaction, the solution was poured into a large amount of water to cause it to coagulate and was filtered and dried to obtain a highly saturated nitrile rubber. The obtained highly saturated nitrile rubber was measured by $^1$H-NMR for hydrogenation rate, whereby the hydrogenation rate was 60%.

Comparative Example 5

Except for changing the coagulation temperature when using the aqueous solution of aluminum sulfate for coagulation to 5° C., the same procedure was followed as in Example 1 to coagulate the latex of nitrile rubber (A1) and thereby obtain the solid form nitrile rubber (A1-2). The amount of residual organic acid of the nitrile rubber (A1-2) was 25 wt %.

Further, the obtained nitrile rubber (A1-2) was dissolved in acetone to a concentration of 12 wt % to thereby obtain an acetone solution of nitrile rubber (A1-2). This was placed in an autoclave, 200 wt ppm of a palladium-silica catalyst and 20 wt ppm of 2,2,4,6,6-pentamethyl-4-octanethiol (compound having mercapto group having 13 carbon atoms) were added with respect to 100 wt % of nitrile rubber (A1-2), then a hydrogenation reaction was performed at a hydrogen pressure of 3.0 MPa for 6 hours. After the end of the hydrogenation reaction, the solution was poured into a large amount of water to cause it to coagulate and was filtered and dried to obtain a highly saturated nitrile rubber. The obtained highly saturated nitrile rubber was measured by $^1$H-NMR for hydrogenation rate, whereby the hydrogenation rate was 80%.

Comparative Example 6

Except for changing the coagulation temperature when using the aqueous solution of aluminum sulfate for coagulation to 70° C., the same procedure was followed as in Example 1 to coagulate the latex of nitrile rubber (A1) and thereby obtain the solid form nitrile rubber (A1-3). The amount of residual organic acid of the nitrile rubber (A1-3) was 30 wt %.

Further, the obtained nitrile rubber (A1-3) was dissolved in acetone to a concentration of 12 wt % to thereby obtain an acetone solution of nitrile rubber (A1-3). This was placed in an autoclave, 200 wt ppm of a palladium-silica catalyst and 20 wt ppm of 2,2,4,6,6-pentamethyl-4-octanethiol (compound having mercapto group having 13 carbon atoms) were added with respect to 100 wt % of nitrile rubber (A1-3), then a hydrogenation reaction was performed at a hydrogen pressure of 3.0 MPa for 6 hours. After the end of the hydrogenation reaction, the solution was poured into a large amount of water to cause it to coagulate and was filtered and dried to obtain a highly saturated nitrile rubber. The obtained highly saturated nitrile rubber was measured by $^1$H-NMR for hydrogenation rate, whereby the hydrogenation rate was 75%.

nation reaction, even when making the amount of use of the hydrogenation catalyst a relatively small 200 wt ppm, the hydrogenation reactivity in the hydrogenation reaction became 90% or more in all cases and a high hydrogenation reactivity can be realized (Examples 1 to 6).

On the other hand, at the time of the hydrogenation reaction, if the content of a compound having a mercapto group having 9 to 12 carbon atoms or the content of a compound having a mercapto group having 13 to 16 carbon atoms in the solution of the nitrile rubber was off from the predetermined range of the present invention, the hydrogenation reactivity in the hydrogenation reaction became low (Comparative Examples 1 to 4).

Further, even when the coagulation temperature when coagulating the latex of nitrile rubber was off from the predetermined range of the present invention, similarly the hydrogenation reactivity in the hydrogenation reaction became low (Comparative Examples 5 and 6).

TABLE 1

| | | Examples | | | | | | Comparative Examples | | | | | |
|---|---|---|---|---|---|---|---|---|---|---|---|---|---|
| | | 1 | 2 | 3 | 4 | 5 | 6 | 1 | 2 | 3 | 4 | 5 | 6 |
| Type of latex of nitrile rubber | | A1 | A1 | A1 | A2 | A2 | A3 | A1 | A1 | A2 | A4 | A1 | A1 |
| Amount of use of molecular weight adjuster used at time of polymerization*1) | | | | | | | | | | | | | |
| 2,2,4,6,6-pentamethyl-4-heptanediol | (part) | 0.5 | 0.5 | 0.5 | — | — | 0.1 | 0.5 | 0.5 | — | — | 0.5 | 0.5 |
| t-dodecylmercaptan | (part) | — | — | — | 0.5 | 0.5 | — | — | — | 0.5 | 0.5 | — | — |
| 2,2,4,6,6-pentamethyl-4-octanethiol | (part) | — | — | — | — | — | 0.3 | — | — | — | — | — | — |
| Presence of heating step after polymerization | | Yes | Yes | Yes | Yes | Yes | No | Yes | Yes | Yes | No | Yes | Yes |
| Content of compound having mercapto group in latex of nitrile rubber*2) | | | | | | | | | | | | | |
| Compound having mercapto group having 9 to 12 carbon atoms | (wt ppm) | 20.0 | 20.0 | 20.0 | 13.5 | 13.5 | 15.0 | 20.0 | 20.0 | 13.5 | 77.0 | 20.0 | 20.0 |
| Compound having mercapto group having 13 to 16 carbon atoms | (wt ppm) | 0.0 | 0.0 | 0.0 | 0.5 | 0.5 | 45.0 | 0.0 | 0.0 | 0.5 | 3.0 | 0.0 | 0.0 |
| Coagulation temperature of latex of nitrile rubber | (° C.) | 30 | 30 | 30 | 30 | 30 | 30 | 30 | 30 | 30 | 30 | 5 | 70 |
| Amount of residual organic acid in nitrile rubber after coagulation | (wt %) | 7 | 7 | 7 | 7 | 7 | 7 | 7 | 7 | 7 | 7 | 25 | 30 |
| Amount of compound having mercapto group added before hydrogenation reaction*3) | | | | | | | | | | | | | |
| 2,2,4,6,6-pentamethyl-4-octanethiol | (wt ppm) | 20 | 80 | — | 5 | 50 | — | — | 140 | — | — | 20 | 20 |
| 2,2,4,6,6,8,8-heptamethyl-4-nonanethiol | (wt ppm) | — | — | 20 | — | — | — | — | — | — | — | — | — |
| Content of compound having mercapto group in solution used for hydrogenation reaction*4) | | | | | | | | | | | | | |
| Compound having mercapto group having 9 to 12 carbon atoms | (wt ppm) | 20.0 | 20.0 | 20.0 | 13.5 | 13.5 | 15.0 | 20.0 | 20.0 | 13.5 | 77.0 | 20.0 | 20.0 |
| Compound having mercapto group having 13 to 16 carbon atoms | (wt ppm) | 20.0 | 80.0 | 20.0 | 5.5 | 50.5 | 45.0 | 0.0 | 140.0 | 0.5 | 3.0 | 20.0 | 20.0 |
| Hydrogenation reactivity at time of hydrogenation reaction | (%) | 95 | 90 | 96 | 90 | 95 | 95 | 70 | 65 | 75 | 60 | 80 | 75 |

*1)Amount with respect to 100 parts by weight of the monomer mixture
*2)Amount with respect to 100 wt % of nitrile rubber
*3)Amount with respect to 100 wt % of nitrile rubber before hydrogenation
*4)Amount with respect to 100 wt % of nitrile rubber before hydrogenation Note that, in Table 1, the content of the compound having a mercapto group in the solution used for the hydrogenation reaction was found from the residual amount of the compound having a mercapto group remaining in the latex of nitrile rubber and the amount of use of the compound having a mercapto group additionally added before the hydrogenation reaction.

From Table 1, when making the coagulation temperature when coagulating the latex of nitrile rubber 10 to 60° C. in range and when making the content of the compound having a mercapto group having 9 to 12 carbon atoms 50 wt ppm or less and making the content of a compound having a mercapto group having 13 to 16 carbon atoms 1 to 120 wt ppm with respect to 100 wt % of content of nitrile rubber in the solution of nitrile rubber when performing the hydroge-

The invention claimed is:

1. A method of production of nitrile rubber having a hydrogen conversion rate of 50% or more comprising:
    a polymerization step of polymerizing a monomer mixture containing at least an α,β-ethylenically unsaturated nitrile monomer and diene monomer in a medium to obtain a dispersion or solution of a nitrile rubber;
    a coagulation step of causing the dispersion or solution of the nitrile rubber to coagulate at 10 to 60° C. to obtain a solid form nitrile rubber; and
    a hydrogenation reaction step of causing the solid form nitrile rubber obtained by the coagulation step to disperse or dissolve in a medium to obtain a dispersion or solution of the nitrile rubber and performing a hydrogenation reaction of the obtained dispersion or solution of the nitrile rubber to thereby obtain a dispersion or solution of a nitrile rubber having a hydrogen conversion rate of 50% or more, wherein
in the hydrogenation reaction, the content of a compound having a mercapto group having 9 to 12 carbon atoms is 50 wt ppm or less and the content of a compound having a mercapto group having 13 to 16 carbon atoms is 1 to 120 wt ppm with respect to 100 wt % of the content of the nitrile rubber in the dispersion or solution of the nitrile rubber,
the method of production further comprises
using a compound having a mercapto group having 9 to 12 carbon atoms and/or a compound having a mercapto group having 13 to 16 carbon atoms as a molecular weight adjuster in the polymerization step, and
adding a compound having a mercapto group having 9 to 12 carbon atoms and/or a compound having a mercapto group having 13 to 16 carbon atoms when causing the solid form nitrile rubber obtained by the coagulation step to disperse or dissolve in a medium to adjust the content of the compound having a mercapto group having 9 to 12 carbon atoms and/or the compound having a mercapto group having 13 to 16 carbon atoms in the dispersion or solution of the nitrile rubber used for the hydrogenation reaction.

2. The method of production of the nitrile rubber having a hydrogen conversion rate of 50% or more according to claim 1, further comprising, after the polymerization step and before the coagulation step, a heating step of heating the dispersion or solution of the nitrile rubber obtained by the polymerization step in the presence of a basic compound.

3. The method of production of the nitrile rubber having a hydrogen conversion rate of 50% or more according to claim 2, wherein the basic compound is an alkali metal compound.

4. The method of production of the nitrile rubber having a hydrogen conversion rate of 50% or more according to claim 2, where the heating temperature of the heating step is 30 to 80° C.

5. The method of production of the nitrile rubber having a hydrogen conversion rate of 50% or more according to claim 1, wherein, in the hydrogenation reaction step, the amount of use of the hydrogenation catalyst is 10 to 1000 wt ppm in range with respect to 100 wt % of the nitrile rubber before hydrogenation.

6. The method of production of the nitrile rubber having a hydrogen conversion rate of 50% or more according to claim 1, wherein
in the hydrogenation reaction, the content of a compound having a mercapto group having 13 to 16 carbon atoms is 5.5 to 120 wt ppm with respect to 100 wt % of the content of the nitrile rubber in the dispersion or solution of the nitrile rubber.

7. The method of production of the nitrile rubber having a hydrogen conversion rate of 50% or more according to claim 1, wherein
in the hydrogenation reaction step, performing the hydrogenation reaction of the obtained dispersion or solution of the nitrile rubber to thereby obtain a dispersion or solution of a nitrile rubber having a hydrogen conversion rate of 90% or more.

* * * * *